United States Patent [19]

Tanaka et al.

[11] 4,327,927
[45] May 4, 1982

[54] SUSPENSION SYSTEM FOR AUTOMOTIVE VEHICLES

[75] Inventors: Toru Tanaka, Nagoya; Yutaka Tomizu, Toyota, both of Japan

[73] Assignee: Toyota Jidosha Kogyo Kabushiki Kaisha, Toyota, Japan

[21] Appl. No.: 188,836

[22] Filed: Sep. 19, 1980

[30] Foreign Application Priority Data

Oct. 4, 1979 [JP] Japan .......................... 54-137485[U]

[51] Int. Cl.³ ............................................. B60G 7/00
[52] U.S. Cl. .................................. 280/96.1; 280/660;
280/690; 280/691; 280/673; 280/695
[58] Field of Search .............. 280/93, 94, 95 R, 95 A,
280/96.1, 660, 661, 662, 663, 664, 665, 666, 667,
668, 670–675, 690, 691, 692, 693, 695, 696

[56] References Cited

U.S. PATENT DOCUMENTS

| | | | |
|---|---|---|---|
| 2,862,741 | 12/1958 | Baker | 280/96.1 |
| 2,996,311 | 8/1961 | Thiry | 280/695 |
| 3,096,994 | 7/1963 | Primeau et al. | 280/96.1 |
| 3,611,419 | 12/1964 | Schaaf | 280/96.1 |
| 4,257,623 | 3/1981 | Kawase et al. | 280/660 |

*Primary Examiner*—Robert R. Song
*Attorney, Agent, or Firm*—Stevens, Davis, Miller & Mosher

[57] ABSTRACT

In a suspension system for an automotive vehicle which comprises a longitudinal shaft fixedly mounted on the vehicle body structure along the fore-and-aft axis, a control arm of the so-called "A" type swingably supported at one end thereof from the shaft by means of a pair of front and rear rubber bushes, and a pair of retainer plates fixed to front and rear ends of the shaft and arranged to receive a load acting on the control arm in the forward or rearward direction through a portion of the respective rubber bushes for restricting forward or rearward displacement of the control arm, a stopper member is secured to the rear portion of the control arm and straddling the rear end of the shaft with a predetermined clearance, the stopper member being brought into engagement with the rear end of the shaft when the load acting on the control arm is larger than a predetermined value.

5 Claims, 3 Drawing Figures

SUSPENSION SYSTEM FOR AUTOMOTIVE VEHICLES

BACKGROUND OF THE INVENTION

The present invention relates to a suspension system for automotive vehicles, and more particularly to an improvement of a double wishbone type suspension, a strut type suspension, and the like.

Such a conventional suspension system as described above comprises a longitudinal shaft fixedly mounted on a vehicle body structure along the fore-and-aft axis of the vehicle, a control arm of the so-called "A" type swingably supported at one end thereof from the longitudinal shaft by means of a pair of front and rear rubber bushes and having a swingable end supporting thereon a road wheel, and a pair of retainer plates fixed to front and rear ends of the shaft and being arranged to receive a load acting on the control arm in the forward or rearward direction through a portion of the respective rubber bushes for restricting forward or rearward displacement of the control arm.

In the case that the control arm is adapted as an upper control arm in the suspension system, the upper control arm will receive a heavy load acting thereon in the forward direction due to braking force of the vehicle or shocks from the road in traveling of the vehicle. In the case that the control arm is adapted as a lower control arm in the suspension system, the lower control arm will receive a heavy load acting thereon in the rearward direction due to braking force of the vehicle or shocks from the road in traveling of the vehicle. This is caused by the fact that the maximum load acting on the control arm in forward traveling of the vehicle is extremely larger than that in backward traveling of the vehicle. When a heavy load acts on the control arm in the forward or rearward direction, one of the retainer plates concentrically receives the heavy load through one of the rubber bushes, and the reaction force from the retainer plate is given to the front or rear portion of the control arm. For this reason, sufficient strength of the rubber bushes, retainer plates, and control arm is required to resist the heavy load and reaction force. This means that the assembly of the rubber bushes, retainer plates and control arm becomes larger in size and causes an obstacle to a small size and light weight construction of the suspension system.

SUMMARY OF THE INVENTION

It is, therefore, a primary object of the present invention to provide an improved suspension system which is designed to disperse the heavy load concentrically acting on the retainer plates so as to ensure the strength of the rubber bushes, retainer plates and control arm in a possibly small construction.

According to the present invention briefly summarized, the primary object is accomplished by provision of a suspension system for an automotive vehicle which comprises a longitudinal shaft fixedly mounted on the vehicle body structure and extending along the fore-and-aft axis of the vehicle, a control arm of the so-called "A" type swingably supported at one end thereof from the longitudinal shaft by means of a pair of front and rear rubber bushes to be swung upwardly and downwardly, the control arm having a swingable end supporting thereon a road wheel, a pair of retainer plates fixed to front and rear ends of the shaft and being arranged to receive a load acting on the control arm in the forward or rearward direction through a portion of the respective rubber bushes for restricting forward or rearward displacement of the control arm, and a stopper member secured to any one of front and rear portions of the control arm and straddling any one of the front and rear ends of the shaft with a predetermined clearance, the stopper member being brought into engagement with the one end of the shaft when the load acting on the control arm is larger than a predetermined value.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
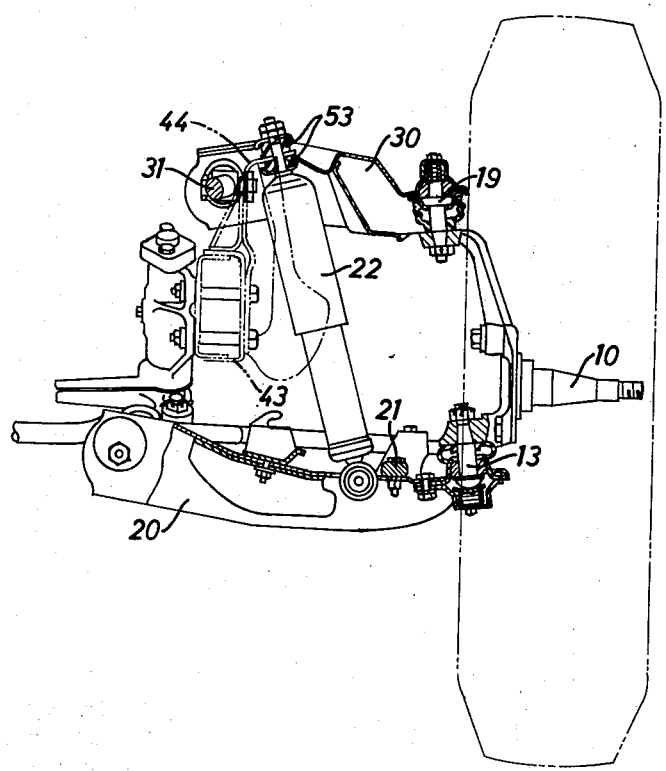
FIG. 1 is a part sectional rear view of a double wishbone type front suspension system in accordance with the present invention.
Figure 2:
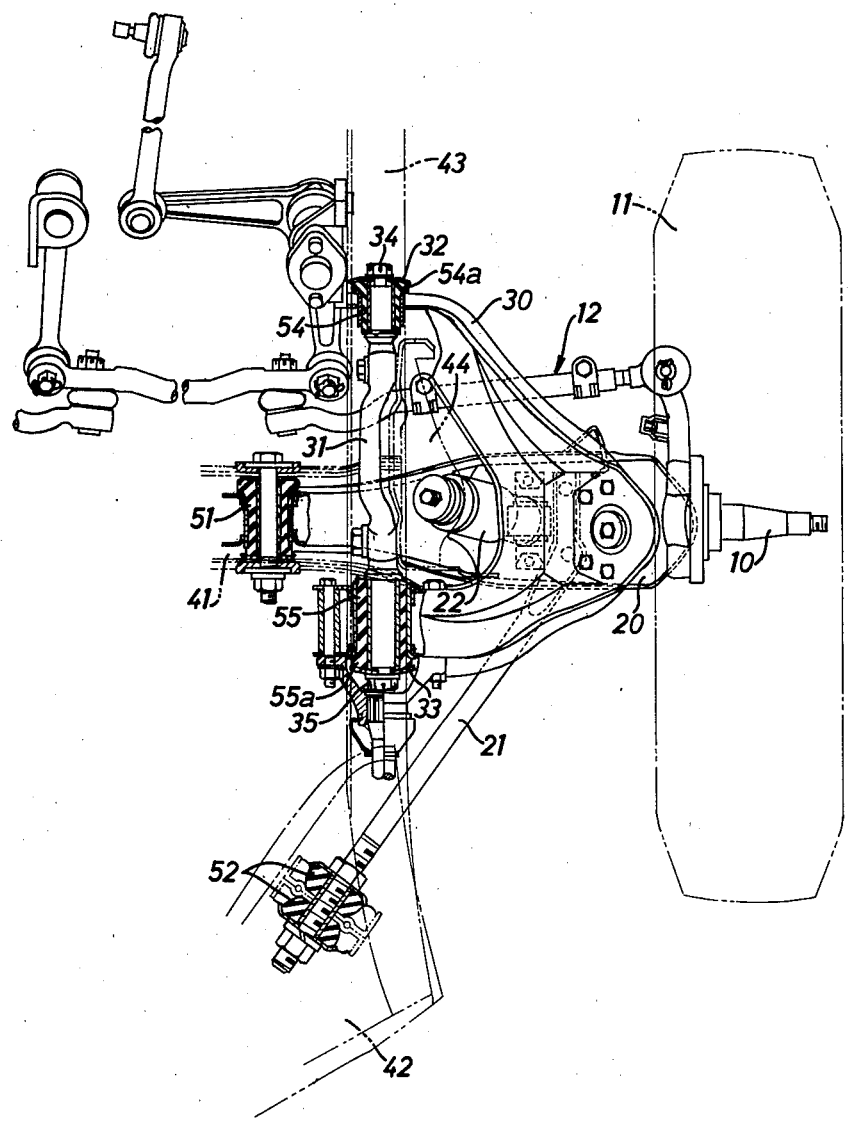
FIG. 2 is a part sectional plane view of the front suspension system shown in FIG. 1.

Referring now to the drawings, FIGS. 1 and 2 illustrates a front suspension system of the double wishbone type which comprises a lower control arm 20 of the so-called "I" type and an upper control arm 30 of the so-called "A" type. A steering knuckle 10 is supported by the swingable end of lower control arm 20 to rotatably support a front road wheel 11 thereon, and it is operatively connected to a steering linkage 12 to be steered. As well seen in FIG. 2, the lower control arm 20 is mounted on a cross-member 41 of the vehicle body structure by means of a sleeve-like rubber bush 51 to be swung upwardly and downwardly. As well seen in FIG. 1, the swingable end of control arm 20 is connected to the lower end of steering knuckle 10 by means of a lower ball joint assembly 13. The lower control arm 20 is also connected at its intermediate portion to the front end of a strut bar 21 and to the lower end of a shock absorber assembly 22. The strut bar 21 is connected at its rear end to a cross-member 42 of the vehicle body structure by means of a cushion assembly 52, and the upper end of shock absorber assembly 22 is connected to a stationary bracket 44 by means of a cushion assembly 53, as shown in FIG. 1. The bracket 44 is fixedly mounted on a side-member 43 of the vehicle body structure.

The upper control arm 30 is supported from a longitudinal shaft 31 by means of a pair sleeve-like rubber bushes 54 and 55 to be swung upwardly and downwardly, and the swingable end of control arm 30 is connected to the upper end of knuckle 10 by means of an upper ball joint assembly 19. The longitudinal shaft 31 is fixedly mounted on the bracket 44 along the fore-and-aft axis of the vehicle and is provided at its opposite ends with a pair of retainer plates 32 and 33 which are held in place by a pair of fastening nuts 34 and 35 threaded on the opposite ends of shaft 31. In the practice, the fastening nuts 34 and 35 may be replaced with a pair of bolts threaded into the opposite ends of shaft 31. The front retainer plate 32 is engaged with an annular flange 54a of rubber bush 54 to receive thereon a load acting on the upper control arm 30 in the forward direction thereby to restrict the forward displacement of control arm 30. The rear retainer plate 33 is engaged with an annular flange 55a of rubber bush 55 to receive thereon a load acting on the upper control arm 30 in the rearward direction thereby to restrict the rearward displacement of control arm 30.

Figure 3:
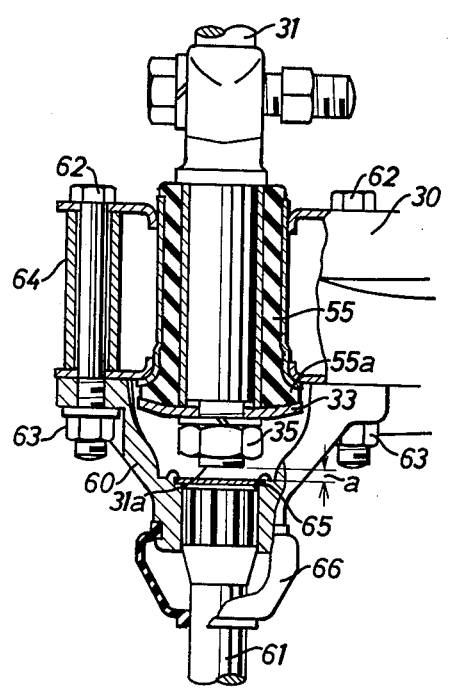
FIG. 3 is an enlarged sectional view of a part of FIG. 2.

As can be well seen in FIG. 3, a longitudinal torsion bar 61 is connected to the rear portion of upper control arm 30 by means of a torque arm member 60 and is located coaxially with the longitudinal shaft 31. The torque arm member 60 is fixed to the rear portion of control arm 30 by means of a pair of bolts 62 and nuts 63 and straddles the nut 35 at the rear end of shaft 31. The bolts 62 are respectively inserted into a collar member 64 assembled within control arm 30. The torsion bar 61 is connected at its front end to the center of torque arm member 60 by means of sline coupling. At the connected portion of torsion bar to torque arm member 60, a cover plate 65 is secured to calking to the center of torque arm member 60, and a dust boot 66 is fixed at its opposite ends to torque arm member 60 and torsion bar 61 to cover the rear portion of torque arm member 60. The cover plate 65 faces to the rear end 31a of shaft 31 with a predetermined clearance a, and it will abut against the rear end 31a of shaft 31 when a load larger than a predetermined value acts on the control arm 30 in the forward direction. In this arrangement, the clearance a is determined to be smaller than the maximum flexure of rubber bush flange 54a. Thus, the cover plate 65 acts as a stopper member to define the spline coupling of torque arm member 60 and torsion bar 61. In addition, the torsion bar 61 is connected at its rear end to a cross-member of the vehicle body structure by means of an anchor bracket (not shown).

With the construction described above, when the upper control arm 30 receives a forward load acting thereon due to braking force of the vehicle or shocks from the road in traveling of the vehicle, the forward load is mainly received by the front retainer plate 32 through the rubber bush flange 54a to restrict the forward displacement of upper control arm 30. If the forward load is larger than the predetermined value, the cover plate 65 abuts against the rear end 31a of shaft 31, and a portion of the forward load is received by the rear end of shaft 31 through torque arm member 60 and cover plate 65 so that the load acting on the front portion of control arm 30 is dispersed. Owing to this dispersion of the forward load, the front portion of upper control arm 30 can be fabricated in a light weight and small size construction. Furthermore, the abutment of cover plate 65 against the rear end of shaft 31 serves to reliably restrict relative displacement of torque arm 60 and torsion bar 61. As a result, the spline coupling of torque arm 60 and torsion bar 61 is maintained in a reliable and stable condition in spite of its simple construction. When the forward load is smaller than the predetermined value, the cover plate 65 does not abut against the rear end of shaft 31. In this instance, both of rubber bushes 54 and 55 act to effectively absorb shocks from the road. This means that the rubber bushes 54 and 55 may be constructed in a relatively small size.

In the preferred embodiment described above, the present invention is adapted to the front suspension system in which the torsion bar 61 is connected to the upper control arm 30, but it is obvious that the present invention may be adapted to a suspension system of the double wishbone type in which a coil spring is disposed between a lower control arm and the vehicle body structure, and a stopper member is secured to the rear portion of an upper control arm of the so-called "A" type. Furthermore, the present invention may be adapted to a front suspension system of the strut type in which a stopper member is secured to the front portion of a lower control arm of the so-called "A" type and faces to one end of a supporting shaft for the lower control arm with a predetermined clearance in the fore-and-aft direction of the vehicle.

In this type of suspension system, when a rearward load acting on the lower control arm is larger than a predetermined value, the stopper member abuts against the rear end of the supporting shaft to disperse the rearward load.

Having thus described the preferred embodiment of the invention it should be understood that numerous structural modifications and adaptations may be resorted to without departing from the spirit of the invention.

What is claimed is:

1. In a suspension system for an automotive vehicle comprising a longitudinal shaft fixedly mounted on the vehicle body structure and extending along the fore-and-aft axis of the vehicle, a control arm of the so-called "A" type supported at one end thereof from said longitudinal shaft by means of a pair of front and rear rubber bushes to be swung upwardly and downwardly, said control arm having a swingable end supporting thereon a road wheel, and a pair of retainer plates fixed to front and rear ends of said shaft and being arranged to receive a load acting on said control arm in the forward or rearward direction through a portion of said respective rubber bushes for restricting forward or rearward displacement of said control arm, the improvement comprising a stopper member secured to any one of front and rear portions of said control arm and straddling any one of the front and rear ends of said shaft with a predetermined clearance, said stopper member being brought into engagement with the one end of said shaft when the load acting on said control arm is larger than a predetermined value.

2. A suspension system as claimed in claim 1, further comprising a torque arm member secured to the rear portion of said control arm and straddling the rear end of said shaft, and a torsion bar connected at its front end to said torque arm member coaxially with said shaft and at its rear end to the vehicle body structure, and wherein said stopper member is a cover plate secured to said torque arm member and facing to the rear end of said shaft with a predetermined clearance.

3. A suspension system as claimed in claim 2, wherein each of said rubber bushes is formed with an annular flange which is interposed between each of said retainer plates and each of the front and rear portions of said control arm, and wherein the predetermined clearance between said cover plate and the rear end of said shaft is smaller than the maximum flexure of the annular flange of said front rubber bush.

4. In a suspension system for an automotive vehicle comprising a longitudinal shaft fixedly mounted on the vehicle body structure and extending along the fore-and-aft axis of the vehicle, an upper control arm of the so-called "A" type supported at one end thereof from said longitudinal shaft by means of a pair of front and rear rubber bushes to be swung upwardly and downwardly, a pair of retainer plates fixed to front and rear ends of said shaft and being arranged to receive a load acting on said control arm in the forward or rearward direction through a portion of said respective rubber bushes for restricting forward or rearward displacement of said control arm, a lower control arm of the so-called "I" type swingable supported at one end thereof from the vehicle body structure to be swung upwardly and downwardly, each of said control arms having a swingable end connected to a knuckle for supporting a road wheel thereon, and a shock absorber assembly connected at its upper end to the vehicle body structure and at its lower end to said lower control arm, the improvement comprising a stopper member secured to the rear portion of said upper control arm and straddling the rear end of said shaft with a predetermined clearance, said stopper member being brought into engagement with the rear end of said shaft when the load acting on said upper control arm is larger than a predetermined value.

5. A suspension system as claimed in claim 4, further comprising a torque arm member secured to the rear portion of said control arm and straddling the rear end of said shaft, and a torsion bar splined at its front end to said torque arm member coaxially with said shaft and anchored at its rear end to the vehicle body structure, and wherein said stopper member is a cover plate secured to said torque arm member and facing to the rear end of said shaft with a predetermined clearance.

* * * * *